United States Patent [19]
Hamjian

[11] 3,841,870
[45] Oct. 15, 1974

[54] METHOD OF MAKING ARTICLES FROM POWDERED MATERIAL REQUIRING FORMING AT HIGH TEMPERATURE

[75] Inventor: Harry J. Hamjian, Reading, Pa.

[73] Assignee: Carpenter Technology Corporation, Reading, Pa.

[22] Filed: Mar. 7, 1973

[21] Appl. No.: 338,829

[52] U.S. Cl............ 75/214, 75/200, 75/223, 75/226, 264/56, 264/125
[51] Int. Cl............ B22f 3/14, B22f 7/06
[58] Field of Search ........... 75/223, 226, 214, 200; 425/78; 264/56, 125

[56] References Cited
UNITED STATES PATENTS

| | | | |
|---|---|---|---|
| 2,476,421 | 7/1949 | Lake | 75/226 X |
| 3,419,935 | 1/1969 | Pfeiler et al. | 425/78 |
| 3,455,682 | 7/1969 | Barbaras | 75/223 X |
| 3,622,313 | 11/1971 | Havel | 75/226 |
| 3,700,435 | 10/1972 | Chandhok | 75/223 X |
| 3,738,830 | 6/1973 | Kimura et al. | 75/226 X |

FOREIGN PATENTS OR APPLICATIONS

| | | | |
|---|---|---|---|
| 558,673 | 6/1958 | Canada | 75/223 |

Primary Examiner—Harvey E. Behrend
Assistant Examiner—R. E. Schafer
Attorney, Agent, or Firm—Edgar N. Jay

[57] ABSTRACT

A pattern is made up of rigid and elastic material with the space between them forming a cavity in which powdered material is compacted by applying hydrostatic pressure to form a mold or part of a mold. The pattern is shaped so that the surface of the rigid material, which is dimensionally stable, forms a working surface of the mold formed in the cavity. Wood, plaster of paris, low melting metals, resins or wax is disclosed for use in forming the rigid portion of the pattern. The elastic material, which can be shaped from rubber or any suitable rubber-like material, facilitates forming the mold with a complex shape. The mold is then filled with powdered material and hot pressed to provide an object having a complex shape with a minimum of waste or expensive machining. Elemental nickel or iron or prealloyed powders are among the preferred powdered materials for making molds for hot pressing objects made of alloys that are difficult to form at high temperatures such as the superalloys. Molds formed from powdered aluminum are disclosed for hot pressing aluminum alloys. Molds made of powdered refractory metals, such as tungsten or molybdenum, are disclosed for hot pressing powdered refractory metals, carbides or ceramics.

13 Claims, 6 Drawing Figures

METHOD OF MAKING ARTICLES FROM POWDERED MATERIAL REQUIRING FORMING AT HIGH TEMPERATURE

This invention relates to a process for making shaped articles from powdered metal and, more particularly, to such a process which is especially well suited to making complex shapes, including shapes having re-entrant or undercut portions, from materials requiring high temperatures for forming such as prealloyed powdered metal formed from high temperature superalloys.

High temperature alloys, that is, the so-called superalloys such as nickel or nickel-iron base alloys with or without chromium and strengthened by means of the addition of such elements as titanium, columbium and/or aluminum are generally characterized by being difficult to hot work so that the provision of wrought products formed from such alloys is usually expensive. To overcome such difficulties, various techniques have hitherto been proposed for compacting and shaping articles from superalloy powders, but they have left much to be desired. For example, U.S. Pat. No. 3,622,313 is concerned with a process in which superalloy powder, sealed in a vitreous container, is heated to a temperature suitable for compacting and is then isostatically pressed while hot to collapse the vitreous container and form a densified compact which is then removed from the vitreous container for further processing. A serious drawback of that process resides in the fact that at the temperatures required for properly compacting the superalloy powders, the vitreous containers used tend to contaminate the compact shape thereby necessitating removal of the surface of the work piece to some depth — a step which is expensive because of the resulting waste of metal and also because of the time and labor involved.

It has also long been known from U.S. Pat. Nos. 2,783,504 and 2,847,708 to provide a mold made entirely, or in part, from elastic material such as rubber formed to the shape of the finished article, into which powdered metal is poured and then, while at room temperature, is isostatically pressed to compact the same. After the mold has been stripped from the green compact, the latter is sintered. While relatively complex shapes may be produced from powdered metal by the process disclosed in those patents, the high densification and homogeneity required of shapes formed from the superalloys cannot readily, if at all, be attained, and this is particularly the case when a shape such as a turbine wheel is to be formed from an alloy such as AF 95 or AISI 685. The difficulties are further multiplied when such a shape as a turbine wheel is to be formed from a powdered superalloy such as AF 95 or AISI 685 with undercut areas or with an axial bore to receive a shaft.

It is, therefore, a principal object of this invention to provide a method for making complex shapes from powdered metal which not only makes possible products having improved homogeneity, but also minimizes the amount of machining or other shaping required to be carried out following consolidation of a green compact into a fully densified shape.

The forming of tools and dies from such materials as tungsten or carbides, as well as the forming of refractory materials such as alumina as well as other metal oxides by hitherto known processes, has also left much to be desired.

A further object of this invention is, therefore, to provide a method by which complex shapes can be economically and accurately formed from powdered refractory materials which refractory materials are difficult to form and shape even at high temperatures by previously known processes.

Yet another object of this invention is to provide such a process by which fully densified powdered metal shapes are formed having improved freedom from unwanted inclusions such as, for example, can result from reactions between the powdered material and the material forming the mold at elevated temperature when the mold is formed from vitreous material.

A more specific object of this invention is to provide such a process by which molds having complex shapes are economically provided by forming them of elemental powdered metal, prealloyed powders or composites thereof, which do not react with the powdered material to be shaped therein to provide a densified shape requiring little or no surface preparation and requiring a minimum of further shaping or working.

Further objects as well as advantages of the present invention will be apparent from the following description of preferred embodiments of the present invention and the accompanying drawing in which FIG. 1 is a cross-sectional view of a pattern constructed for making half of a mold from powdered metal for use in carrying out the process of the present invention;

Figure 1:
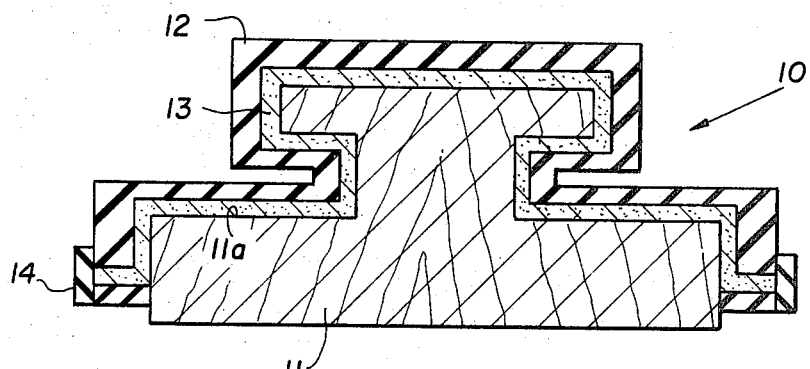

In making a complex shape from a superalloy in accordance with the present invention, a composite pattern 10 is preferably first prepared from a rigid material 11 and an elastic material 12. The structure of the pattern is arranged so that the working surface 11a of the pattern formed by the rigid material will form the working surface of the mold to be formed thereon. By "working surface" of the mold is intended the surface which forms the cavity of the mold into which the prealloyed superalloy powder is to be placed for hot pressing. Depending on the shapes involved and whether a unitary mold or one formed from two or more parts is to be formed, the rigid portion 11 of the pattern 10 can be made from such readily shaped or cast materials as wood or plaster of paris. When a one-piece hollow mold is to be formed having an internal working cavity, then the rigid portion of the pattern used in forming such a mold is preferably formed from a low melting metal such as lead or a low melting plastic or resin could be used. By "low melting" it is intended to include melting points of up to about 1,000° F. It is only necessary that the rigid material be capable of retaining its shape under the pressure used to form the green powdered metal compact, thereby stabilizing the important dimensions of the mold to be formed on the pattern. It is to be noted that because hydrostatic pressure is preferably used to form the green compact, the rigid pattern material 11 is subjected substantially to equal pressure forces over its entire area and, therefore, need not be strong.

The elastic portion 12 of the pattern 10 can be formed of rubber or any other rubber-like material suitable for transmitting substantially uniformly the hydrostatic pressure by which the powdered metal in the assembled pattern is pressed to form a green compact. The elastic material is shaped or contoured to match the shape of the working surface of the rigid portion of the pattern, but is just enough larger than it so that when the two parts are joined, they form between them a cavity into which a suitable elemental powder 13, such as powdered iron, nickel or aluminum or a suitable alloy in powder form, is introduced until the cavity is filled. Convenient openings are formed in the elastic portion of the pattern through which the powdered metal can be poured into or, as in the case of very complex shapes, slip cast in the cavity of the pattern.

In some instances, particularly when the rigid material is not formed from a low melting point material, it will be desirable to use a parting compound to facilitate stripping the pattern from the compact to be formed therein. Any suitable parting materials may be used, as will be evident to those skilled in the art, including soap, wax, or mineral oil.

The working cavity of the pattern 10 is filled with powdered metal. A wide variety of powdered metals or prealloyed powders can be used so long as care is exercised in selecting one which is sufficiently soft and yieldable at the temperature required for densification of the product for which the mold is to be used to facilitate isostatic pressing of the work piece therein and yet not melt. Suitable powdered metals include elemental iron, nickel or any suitable prealloyed powders when the mold to be formed is to be used in making a shape from a superalloy such as, for example, type AF 95 or AISI 685. However, when the mold to be formed in the pattern is to be used to form a shape of one of the refractory metals or alloys such as tungsten, one or more carbides, or of alumina and the like, then the pattern cavity is preferably filled with powdered tungsten, powdered molybdenum or other high melting point metal. When the final parts to be formed are to be made from a powdered aluminum alloy, then the pattern cavity can be filled with powdered aluminum.

Except for the more complex shapes, the powdered metal is readily introduced into the pattern cavity by pouring. If desired, the metal powder may be agitated as by vibrating to facilitate attaining better distribution of the powder in the cavity. It should be noted that, because the body now to be shaped is not to be used as a final product but is only for use as a mold or part of a mold, it is not necessary to provide the same degree of uniform density as may be required in the case of the final product. In any event, when forming complex molds shaped to form a product having re-entrant or undercut portions, then it may be desirable to introduce the powdered metal into the pattern cavity by means of slip casting. In that event, the rigid portion 11 of the pattern should be pervious to the liquid vehicle used in slip casting. After the pattern cavity has been filled, the openings leading into the cavity are sealed as indicated at 14.

The pattern is sealed in a bag which is then immersed in a hydraulic fluid and subjected to hydrostatic pressure ranging from about 15,000 to 100,000 psi. For example, in forming a green compact from elemental iron powder having a particle size of −60 mesh (small enough to pass through a 60 mesh screen), pressing at about 60,000 psi will provide good results. It is to be noted that when the pattern filled with the powdered metal is subjected to hydrostatic pressure while cold, the elastic portion 12 of the pattern permits the powdered metal to be substantially uniformly pressed against the working surface of the rigid portion 11 of the pattern, which is accurately formed to the desired shape, thereby providing a stable surface so that an accurately dimensioned mold surface is formed. Instead of a hydraulic fluid, cold isostatic pressing of the powder in the pattern cavity can be carried out by placing the enclosed pattern in an autoclave and using a nonreactive gas, such as argon, under pressure.

The green compact is removed from the pattern and then heated to strengthen the structure for use as a mold 15 as will now be described. For this purpose, sintering is carried out at a temperature high enough for interparticle diffusion and bonding to take place, but preferably not high enough to melt the material of which the compact has been formed, usually about 50° F below its melting point. In the case of elemental nickel powder, a suitable sintering temperature ranges between about 2,500° and 2,600° F for nickel and for iron from about 2,550° to 2,740° F.

When, as described in connection with FIGS. 1 and 2, the compacted and sintered part forms only a portion of the mold to be used in making the final product, the mold parts are joined together, as by welding (FIG. 2), to provide a mold 15 forming a mold cavity 16. Openings are formed in the wall of the mold 15 communicating with its interior for introducing the powdered material 16a into the mold cavity 16. When the cavity has been filled with powder, the mold is sealed, or, if desired, it can be evacuated to a low pressure such as about 1 micron Hg prior to sealing. The sealed mold is then heated to a temperature suitable for hot isostatic pressing of its powder contents and exposed to gas under pressure in an autoclave. The mold can be heated before or after being placed in the autoclave and the temperature to which the mold and its contents is heated should be at least high enough so that the attainable gas pressure applied to the mold will be above the deformation strength of the material at that temperature. In the case of powders prepared from such alloys as AF 95 or AISI 685, the temperature to which the mold and the powder contained therein should be heated can range from about 2,000° to 2,200° F. The pressure and duration of its application that are required become less as the temperature is increased, and the pressure can thus vary from about 1,000 psi to about 30,000 psi. In the case of some alloys, undesirable changes in microstructure can occur if the powder material is heated too high for too long a time, and, to avoid such difficulties, the lower temperatures and pressures up to 30,000 psi or higher may be used. In practice, the most desirable combination of temperature and pressure based on the microstructure and properties desired can be readily determined for a wide variety of powdered materials as is well known in the art.

Whatever the combination of mold material and its powdered contents, the mold material is selected such that it is soft enough at the pressing temperature to permit isostatic pressing of its powdered contents to take place. For best results, it is preferred to use an inert gas such as argon or helium as the pressure medium in the autoclave, although other gases or liquids could be used.

Figure 2:
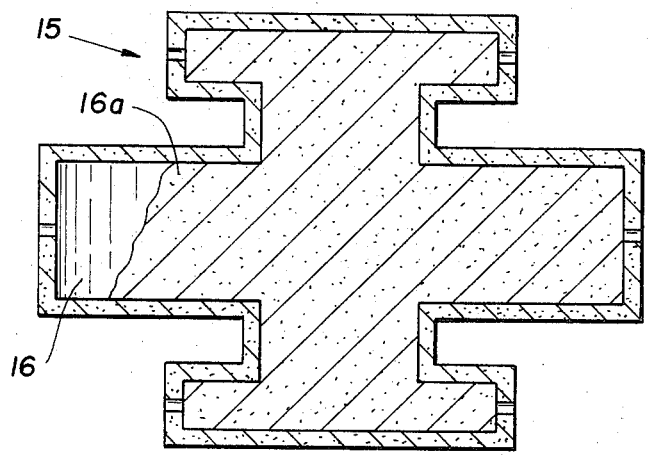
FIG. 2 is a cross-sectional view of the mating halves of the powdered metal mold constructed in accordance with the present invention and filled with prealloyed superalloy powder just prior to hot pressing.

In the case of a turbine wheel preform 17 made of AF 95 or AISI 685 in a mold made from powdered iron, as shown in FIG. 2, hot pressing can be carried out at about 2,000° to 2,200° F, but a temperature near the upper end of that range is preferred with a pressure of about 15,000 psi. For such a part, the heating and cooling cycle may require about 12 hours because of its thickness. The application of pressure may be for an hour or the very short time required for the application of pressure by explosive forces.

The mold 15 is then removed from the autoclave and stripped from the preform 17 in any suitable way such as by grinding or by dissolving it away in acid. To complete the part, a minimum of further shaping is required. In this instance, an axial bore for a shaft is to be formed as well as peripheral slots to receive the ends of the blades. Little or no surface dressing should be required. By selecting materials having the required strength without further working beyond that incidental to the hot pressing described, no further hot or cold working should be required. Similarly, the temperature and duration of the hot pressing is controlled to avoid undesirable microstructural changes in thematerial.

Figure 4:
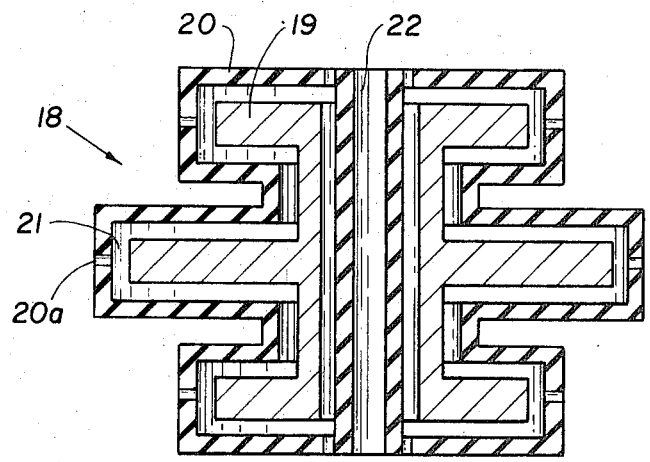
FIG. 4 is a perspective view, partially cut away showing a pattern for making a powdered metal mold to be used in making a turbine wheel made from superalloy powder.
Figure 5:
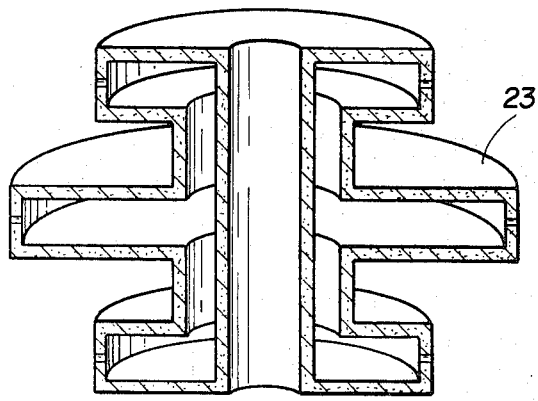
FIG. 5 is a sectional view of the mold prepared from the pattern of FIG. 4.
Figure 6:
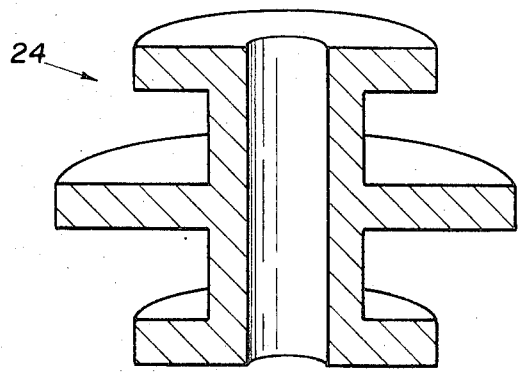
FIG. 6 is a sectional view of a turbine wheel made using the mold of FIG. 5.

Referring now to FIGS. 4, 5 and 6, pattern 18 comprises a wax or low melting point resin core 19 and a rubber latex cover 20 which forms a pattern cavity 21 with the core 19. The cover 20 is readily formed by dipping a suitably shaped mold one or more times into a latex bath to build up the desired thickness as is well known. The dipping mold used should have the shape of the core 19, but is just enough larger than it so that the pattern cover 20 will be larger than the core 19 and thus form the cavity 21. To facilitate removal of the cover 20 from the mold on which it was built up and mounting about the pattern core 19, the cover 20 is conveniently cut in two along its horizontal center line both about its outer periphery and within the transverse bore 22. When it has been assembled about the core 19, it is readily sealed by means of a suitable cement.

Figure 3:
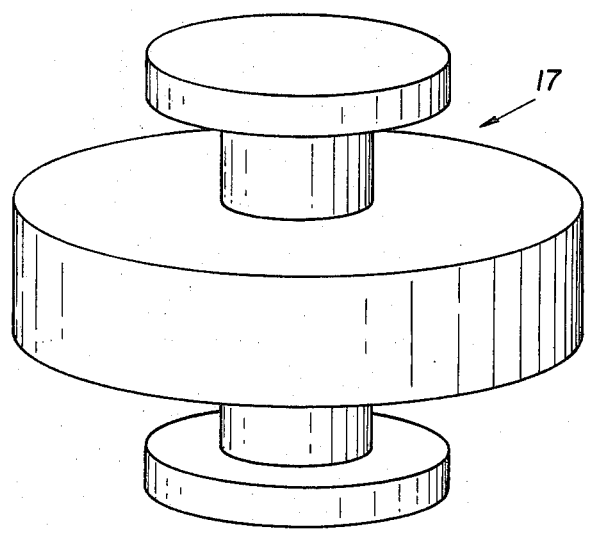
FIG. 3 is a perspective view of a superalloy preform after the mold has been removed following hot pressing.

Openings 20a are provided at convenient locations, and the powdered material to be formed into the mold 23 is introduced into the cavity 21. When the cavity 21 has been filled, the pattern can be evacuated if desired and then sealed. Further processing is carried out as was described in connection with FIGS. 1–3 except that, after sintering of the compact in the pattern, one or more openings are formed in the wall of the newly formed mold 23, and, after the core material has been melted, it is poured out. Also, after making the turbine wheel 24 (FIG. 6) and stripping the mold 23, no further shaping of the turbine wheel 24 is required other than that incident to mounting the blades (not shown) about its periphery.

It is also contemplated that a turbine wheel with integral blades be formed by the present process by forming a mold of the required shape from powdered metal and then hot isostatically pressing prealloyed powder in the mold to form the combined turbine wheel with blades as a unitary one-piece body.

While the present invention has been described at length in connection with the making of a turbine wheel preform and a turbine wheel, it is also intended to include within its scope and the appended claims, the formation of a wide variety of intermediate and final shapes or articles from a wide variety of starting materials. The present process lends itself to the formation of shapes from substantially all materials that can only be successfully formed at high temperatures.

It should also be noted that both the mold formed from powdered material as well as the powdered material article hot pressed therein can be built up using more than one material. Suitable metallic and inorganic nonmetallic powders can be mixed together or introduced separately into the mold cavity. For example, when a cutting tool is to be made, the portion of the mold shaped to form the working end of the tool is filled with powdered tungsten carbide (and a suitable matrix powder) or other wear-resistant material, and the remainder is filled with an alloy which is tough and has good impact strength. Similarly, expensive or extremely difficult to work compositions can be limited to those areas where their presence is actually required.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. The method of making a densified object from metallic and inorganic nonmetallic powders and combinations thereof, comprising forming at least one rigid pattern portion with a surface thereof having a predetermined shape, forming at least one readily deformable pattern portion having a surface complementary to but larger than said predetermined shape, joining said rigid and deformable pattern portions to form a pattern defining a mold-forming cavity between them, filling said mold-forming cavity with mold-forming powdered metal selected from the group consisting of elemental powders, prealloyed metal powders and combinations thereof, compacting said mold-forming powdered metal by applying pressure substantially uniformly over substantially the entire outer surface of said pattern to form a green compact, strengthening said green compact to form a mold, filling said mold with powdered material suitable for densification by pressing at a temperature above the softening temperature of said mold, heating said mold and its contents to a temperature above the softening point of said mold, isostatically pressing said mold at a pressure high enough to exceed the deformation strength of said contents while thus heated to densify said contents and form a densified object, and then removing said mold from the densified object.

2. The method as set forth in claim 1 wherein said rigid pattern portion is formed of wood.

3. The method as set forth in claim 1 wherein said rigid pattern portion is formed of plaster of paris.

4. The method as set forth in claim 1 wherein said rigid pattern portion is formed of a low melting material.

5. The method as set forth in claim 4 in which said low melting material is selected from the group consisting of metal and resin having a melting point below about 1,000° F.

6. The method as set forth in claim 1 wherein hydrostatic pressure is applied to said pattern to form the green compact.

7. The method as set forth in claim 6 wherein the powdered material used to fill said mold-forming cavity is selected from the group consisting of elemental metal powders, and prealloyed metal powders.

8. The method as set forth in claim 6 wherein the powdered material used to fill said mold-forming cavity is selected from the group consisting of powdered iron, nickel, aluminum, tungsten and molybdenum.

9. The method as set forth in claim 7 wherein said powdered material selected from the group consisting of elemental and prealloyed metal powders is slip cast in said mold-forming cavity.

10. The method as set forth in claim 1 wherein said green compact is sintered to form said mold.

11. The method as set forth in claim 1 wherein said mold is formed from powdered iron, the powdered material suitable for densification is a superalloy, and said isostatic pressing is carried out while said mold and its contents is at a temperature of about 2,000° to 2,200°F.

12. The method as set forth in claim 11 wherein said isostatic pressing is carried out at a pressure ranging from about 1,000 psi to 30,000 psi.

13. The method as set forth in claim 11 wherein said isostatic pressing is carried out at a pressure of about 15,000 psi.

* * * * *